US005986777A

United States Patent [19]

Stephenson

[11] Patent Number: 5,986,777

[45] **Date of Patent: *Nov. 16, 1999**

[54] APPARATUS FOR READING OR WRITING PIXELS ON PHOTOGRAPHIC FILM

[75] Inventor: Stanley W. Stephenson, Rochester, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/857,849

[22] Filed: May 16, 1997

[51] Int. Cl.[6] .............................. H04N 1/04; H04N 1/46

[52] U.S. Cl. .......................... 358/506; 358/487; 358/474

[58] Field of Search .................................. 358/506, 487, 358/472, 474, 302; 382/112; 347/232, 115

[56] References Cited

U.S. PATENT DOCUMENTS

| | | | |
|---|---|---|---|
| 4,041,454 | 8/1977 | Shepard et al. | 358/285 |
| 4,806,965 | 2/1989 | Yamanouchi et al. | 355/41 |
| 4,845,551 | 7/1989 | Matsumoto | 358/80 |
| 5,032,861 | 7/1991 | Pagano | 354/275 |
| 5,537,214 | 7/1996 | Aiba et al. | 358/472 |
| 5,751,343 | 5/1998 | Hibino et al. | 358/506 |
| 5,754,314 | 5/1998 | Araki et al. | 358/487 |
| 5,805,206 | 9/1998 | Yokonuma et al. | 358/302 |

*Primary Examiner*—Joseph Mancuso
*Assistant Examiner*—Hien Truong
*Attorney, Agent, or Firm*—Raymond L. Owens

[57] ABSTRACT

Apparatus effective in a reading condition to read photographic pixels from developer film in a cartridge and in a writing condition to expose unexposed film in such cartridge is disclosed. The apparatus moves the photographic film to a reading and writing position. Different colored light are transmitted to the photographic film. The apparatus is effective when in the writing condition for modulating such light for causing the optical means to transmit light of different colors to form pixels of different colors on the unexposed photographic film, and means effective when in a reading condition for illuminating exposed and developed photographic film. A sensor is provided for detecting light reflected from the illuminated photographic film to determine the exposure level of colored pixels on the exposed film.

11 Claims, 1 Drawing Sheet

APPARATUS FOR READING OR WRITING PIXELS ON PHOTOGRAPHIC FILM

FIELD OF THE INVENTION

The present invention relates to apparatus adapted to both read and write pixels on a photographic film.

BACKGROUND OF THE INVENTION

Photographic systems capture a series of images on strips of sensitized film. After exposure, the film strip is chemically processed to develop a stable negative images on the film. These film strips are passed through printers that serially focuses each image onto a matching area on a strip of photosensitive paper. Each image is pre-analyzed for density and color balance, and the exposure of the film image onto the paper is controlled to correct for errors in film density and film color balance.

Film writers create continuous tone images on film by moving a modulated beam of light across the film. Three light emitting diodes can generate a beam of modulated red green and blue light that is moved across the film as a series of stripes. As the beam is moved, the intensity of the light is modulated to create pixels of varying density onto the film. Sequential stripes are written to create a two dimensional photographic image on the film.

Film scanners sequentially passes a beam of light in stripes across exposed and developed film. Sensors measure the intensity of the beam that is transmitted through the negative image to measure the density of the image on the film. The measurement of red, green and blue spectra of light passing through the film is used to create a digital representation of the image on the film.

The Advanced Photographic System from Kodak describes a system that spools the strip of light sensitive emulsion into a light tight cartridge. The cartridges are used to store both developed and unexposed film strips. The spool is positioned within the cartridge to indicate whether the type of film in the cartridge is developed or unexposed.

SUMMARY OF THE INVENTION

It is an object of the present invention to provide an apparatus that can either read or write information on photographic film.

These objects are achieved by apparatus effective in a reading condition to read photographic pixels from developed film in a cartridge and in a writing condition to expose unexposed film in such cartridge, comprising:

a) means for moving the photographic film to a reading and writing position;

b) means for providing light of different colors;

c) optical means for transmitting the different colored light to the photographic film;

d) means effective when in the writing condition for modulating such light for causing the optical means to transmit light of different colors to form pixels of different colors on the unexposed photographic film; and e) means effective when in a reading condition for illuminating exposed and developed photographic film with light including:

i) sensing means for detecting light reflected from the illuminated photographic film to determine the exposure level of colored pixels on the exposed film.

ADVANTAGES

The present invention takes a cartridge for both reading and writing to film. A simple common set of components (optics, scanning) is shared for both the reading and writing processes. The apparatus uses a common film track for both operations. In addition, the apparatus senses the state of the film cartridge to prevent writing to developed film or read from undeveloped film.

DETAILED DESCRIPTION OF THE INVENTION

Figure 1:
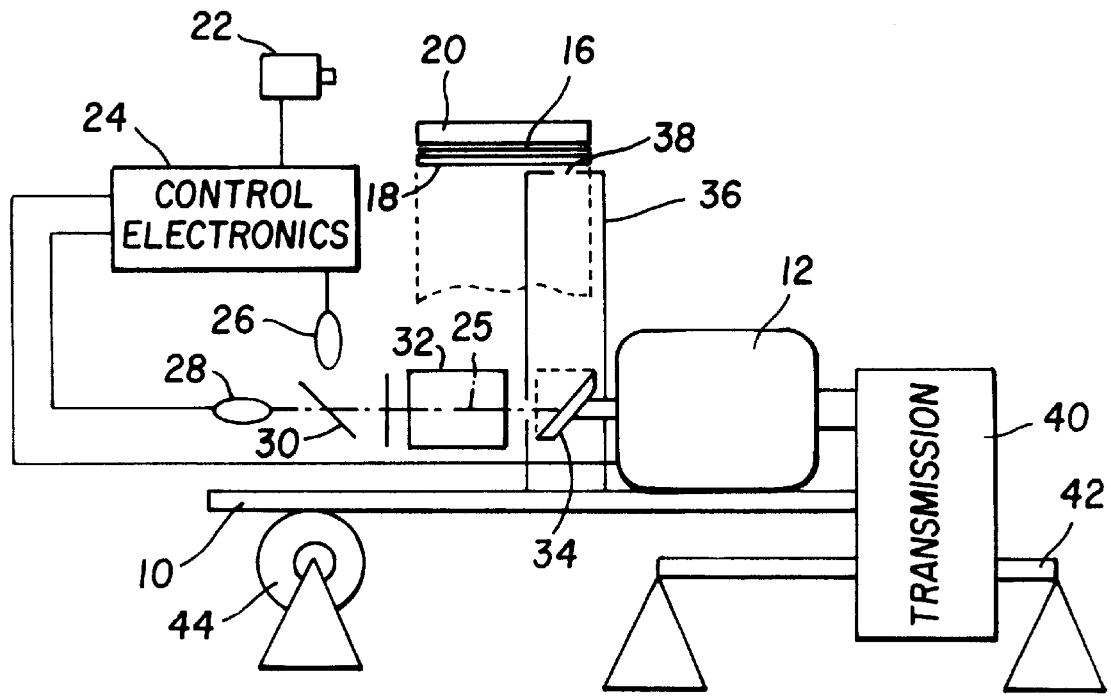
FIG. 1 is a side view of apparatus in accordance with the present invention.
Figure 2:
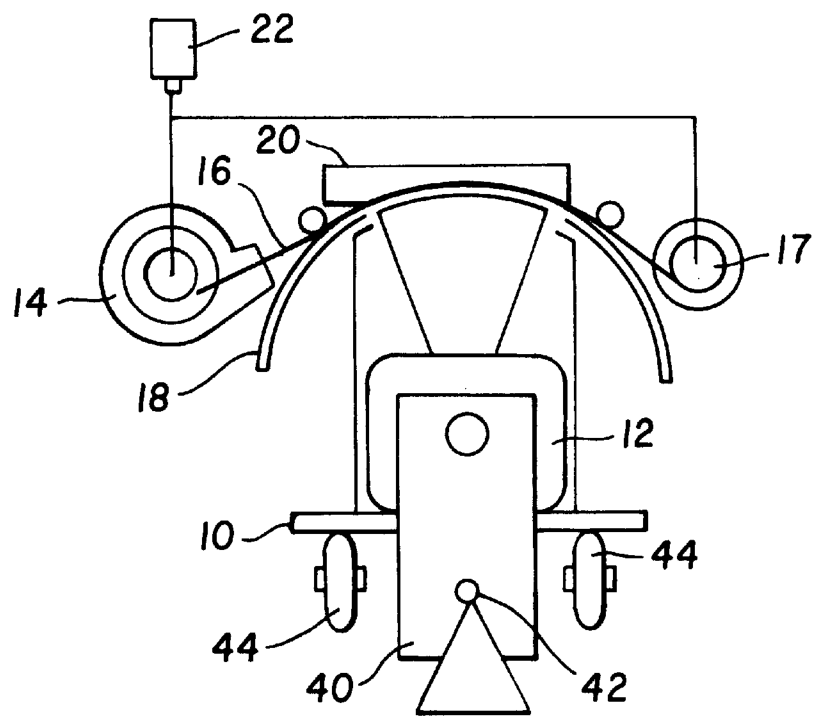
FIG. 2 is a sectional view of the apparatus of FIG. 1.

The invention is directed to apparatus that both reads and writes information on photographic film 16. The photographic film 16 is disposed in a cartridge which can, of course, have exposed and unexposed film. The reading and writing apparatus is supported on a common base 10. Base 10 supports a scan driver 12 that is used to translate base 10 a distance transverse to the motion of photographic film 16. The apparatus has a structure for supporting a film cartridge 14. Film cartridge 14 is a light tight cartridge that stores photographic film 16 on a spool. The cartridge can take numerous forms known in the art such as that used in a Kodak APS Cartridge, which is commercially available. Both unexposed or exposed or developed photographic film can be stored in such a cartridge. The type of photographic film in the cartridge is indicated by the angular position of the spool as is well described by the prior art. Provision is made in such cartridges to thrust photographic film 16 from cartridge 14 as is well known in the art.

Cartridge 14 is loaded into the apparatus for writing on unexposed film or for reading exposed and developed film. The film is in the cartridge and, after selected portions of the film are exposed, they can be developed and the film can be returned to the cartridge and inserted in the apparatus. A film drive 22 thrusts the photographic film 16 from cartridge 14. Photographic film 16 is thrust across film guide 18 onto a take up spool 17. Backer plate 20 forms the other half of the film passage and is mirrored on the surface facing the photographic film. Compliant urging by a spring loaded roller urges the photographic film 16 against take-up spool 17. A drive arrangement (not shown) permits film drive 22 to first thrust the photographic film across film guide 18 onto take-up spool 17 and then pull photographic film using take-up spool 17 using well known means. An opening in film guide 18 corresponds to an framed image area on photographic film 16. Control of film motion and scan driver 12 is done by common control electronics 24.

A set of light emitting diodes LEDs 28 provide modulated outputs of red, green and blue light. The LEDs can be a Siemens Multi TOPLED part number LSPB T670. The Siemens part uses three separate chips to selectively emit light at 480 nm (blue), 557 nm (green), and 630 nm (red) wavelength. A sensor 26 senses light on a common optical path by use of splitter mirror 30. The sensor can be Siemens photo transistor BPW 345. The Siemens transistor is sensitive across the visible light spectrum, such as produced by the Siemens 3 color LED package. Light from LEDs 28 passes through splitter mirror 30 while a half mirrored coating on splitter mirror 30 permits sensor 26 to sense light coming back along optical path 25. Light on optical path 25 passes through focusing optics 32 which is directed to a single pixel on photographic film 16. The optical path strikes mirror 34 attached to the shaft on scan driver 12. Optical path 25 is swept longitudinally across photographic film 16 by rotation of mirror 34. A mask 36 prevents problems from stray light by permitting light to operate only through slit 38 formed in mask 36.

Rotation of scan drive 12 moves optical path 25 through transmission 40 and operates through support shaft 42 to move base 10 transverse across photographic film 16. Two support rollers 44 are provided to support base 10. In one case, scan driver 12 is a DC motor spinning at 1800 rpm. The scan area on the photographic film is 16.7 mm wide and 30.2 mm wide and is written as 480 longitudinal lines by 868 pixels that are 85 microns square. Writing occurs to the photographic film in one-quarter of the rotation of mirror 34. Therefore, the radius on film guide 18 is twice the frame width, or 60.4 millimeters. The radius on film guide 18 provides a 85 microsecond dwell time per pixel. Transmission 40 is geared to provide 85 microns of advancement of base 10 for each rotation of scan driver 12. Scanning a frame on photographic film 16 is done in 480 revolutions that are completed in 16 seconds.

When the apparatus is used to write on photographic film 16, control electronics 24 modulates the intensity of light to the three LEDs to correspond to the intensity of an image stored in control electronics 24. All three colors can be emitted simultaneously from LEDs 28. The light passes through focusing optics 32 is redirected by mirror 34 and illuminates a pixel on photographic film 16. The anti-halation backing on photographic film 16 absorbs any stray light before the light hits the mirrored surface on backer plate 20. In one embodiment, the 85 microsecond write time is broken into 85 one microsecond write sub-periods that permit near continuous tone image writing on film 16. In another embodiment, the current delivered to each of the three light sources in LEDs 28 is varied in response to the density of three digital values corresponding to a pixel of a digital image stored by control electronics 24. After a single rotation, base 10 has advanced to the next line. The next line of the digital image is written and the process is repeated until a complete image has been written to photographic film 16 in 480 stripes by the advance of base 10 across the frame on photographic film 16.

Reading the photographic film uses the same scan method of rotating mirror 34 and advancing base 10 across the photographic film 16. Control electronics 24 sequentially activates each color of LEDs 28 for 28 microseconds within the 85 microseconds of scan time that correspond to a given pixel of an image stored on photographic film 16. The single color of light passes through optical axis 25 and passes through photographic film 16. The reflective surface on backer plate 20 reflects the single color of light back through the photographic film, forming an illuminated pixel on photographic film 16. The intensity of the emission corresponds to the density of a given color of the pixel on photographic film 16. Light reflected from the photographic film passes back along optical axis 25, and is gathered by focusing optics 32. The concentrated light reflects off of splitter mirror 30 and onto sensor 26. Control electronics 24 stores a reading for each of three colors for each pixel scanned to create a color digital image from the developed photographic film 16.

The invention has been described in detail with particular reference to certain preferred embodiments thereof, but it will be understood that variations and modifications can be effected within the spirit and scope of the invention.

What is claimed is:

1. Apparatus effective in a reading condition to read photographic pixels from an image on photosensitive media in a cartridge and in a writing condition to expose unexposed photosensitive media in such cartridge, comprising:

means effective in reading and writing conditions for illuminating the photographic film whether exposed or unexposed with light of different colors;

means effective when in the writing condition for modulating such light for a causing the optical means to transmit light of different colors to form pixels of different colors on the unexposed photosensitive media;

means effective when in a reading condition for illuminating exposed and developed photosensitive media with light including:

sensing means for detecting light reflected from the illuminated photosensitive media to determine the exposure level of colored pixels on the exposed film; and a shared reading and writing station having a single film cartridge position and a common optical path at the film for reading and writing.

2. Apparatus effective in a reading condition to read photographic pixels from an image on a film in a cartridge and in a writing condition to expose image writable film in such cartridge, comprising:

a shared reading and writing station having a single film cartridge position and a common optical path at the film for reading and writing and including means for moving the photographic film to a reading and writing position;

means for providing light of different colors;

optical means, included in said station, for transmitting the different colored light to the photographic film;

means effective when in the writing condition for modulating such light for causing the optical means to transmit light of different colors to form pixels of different colors on the unexposed photographic film; and means effective when in a reading condition for illuminating exposed and developed photographic film with light including:

sensing means for detecting light reflected from the illuminated photographic film to determine the exposure level of colored pixels on the exposed film.

3. Apparatus effective in a reading condition to read photographic pixels from an exposed film and in a writing condition to expose unexposed film, comprising:

a shared reading and writing station having a single film cartridge position and a common optical path at the film for reading and writing including means defining an optical path and means for moving such optics so as to move the optical path to different positions relative to the photographic film;

means for sequentially providing light of different colors;

optical means, included in said station, for transmitting colored light along the optical path so that the colored light is transmitted to the photographic film;

means effective when in the writing condition for modulating such light for causing the optical means to transmit light of different colors along the optical path to form pixels of different colors on the unexposed photographic film; and means effective wherein a reading condition for illuminating the photographic film with light of different colors including:

sensing means for detecting light reflected from the exposed photographic film along the optical path to determine the exposure level of colored pixels on the exposed film.

4. The apparatus of claim 2 further including a cartridge for mounting the photographic film and means responsive to the cartridge to determine whether the cartridge has exposed or unexposed film.

5. The apparatus of claim 2 wherein the light providing means includes a source of light which can produce three separate colors.

6. The apparatus of claim 2 wherein the optics moving means includes a rotating mirror and means for translating and rotating such mirror to move the optical path.

7. The apparatus of claim 2 wherein the sensing means includes a semiconductor photo sensor.

8. An apparatus, comprising:

a film reading and writing station having a single film position and a common optical path for reading and writing film;

a light source providing light to said station during the reading and writing of the film; and a light sensor sensing light from the station during reading of the film.

9. An apparatus as recited in claim 8, wherein said station comprises a scanning mirror used during the reading and writing.

10. An apparatus as recited in claim 8, wherein said station comprises focus optics used during the reading and writing.

11. An apparatus, comprising:

a film reading and writing station having a single film position, a common optical path over which reading and writing film occurs, a scanning mirror used during the reading and writing and focus optics used during the reading and writing;

a light source providing light to said station during the reading and writing of the film; and a light sensor sensing light from the station during reading of the film.

* * * * *